(12) United States Patent
Monk

(10) Patent No.: US 7,349,176 B2
(45) Date of Patent: Mar. 25, 2008

(54) TAPE GUIDE SYSTEM FOR A MAGNETIC TAPE TRANSFER APPARATUS

(75) Inventor: Russell Ian Monk, Caldicot (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 412 days.

(21) Appl. No.: 11/119,146

(22) Filed: Apr. 29, 2005

(65) Prior Publication Data

US 2005/0248875 A1    Nov. 10, 2005

(30) Foreign Application Priority Data

Apr. 30, 2004    (GB) .................................. 0409671.5

(51) Int. Cl.
*G11B 5/027*    (2006.01)

(52) U.S. Cl. .......................................... 360/94; 360/85

(58) Field of Classification Search ............ 360/94–95, 360/85
See application file for complete search history.

(56) References Cited

U.S. PATENT DOCUMENTS 4,964,001 A * 10/1990 Hirayama et al. ............ 360/94
5,717,539 A * 2/1998 Takada ......................... 360/85
6,104,569 A    8/2000 Chae et al.
2002/0195517 A1    12/2002 Nagasaki et al.
2005/0094310 A1* 5/2005 Kondo ......................... 360/85
2005/0134998 A1* 6/2005 Cho ............................. 360/85

FOREIGN PATENT DOCUMENTS

| EP | 01314413 | 1/1985 |
| EP | 0329180 | 8/1989 |
| EP | 0514011 | 11/1992 |
| JP | 05062303 A | 3/1993 |
| JP | 8-106683 | 4/1996 |
| JP | 2000-306290 | 11/2000 |

* cited by examiner

*Primary Examiner*—Brian E. Miller

(57) ABSTRACT

A tape guide system for supporting magnetic tape about a rotary scan drum of a data transfer apparatus is disclosed. The tape guide system comprises a tape guide connected to an arm. The tape guide has a deployed position in which a supporting surface of the tape guide supports the magnetic tape and a non-deployed position in which the supporting surface is spaced from and non-aligned with a surface of the tape to be supported. The arm is arranged to be driven about an axis of rotation towards the deployed position. The axis of rotation of the arm is inclined such that, in the deployed position at least part of the supporting surface of the tape guide is substantially aligned with the surface of the tape to be supported. Other systems and methods are also provided.

9 Claims, 6 Drawing Sheets

TAPE GUIDE SYSTEM FOR A MAGNETIC TAPE TRANSFER APPARATUS

CLAIM TO PRIORITY

This application claims priority to copending United Kingdom application entitled, "Tape Guide System," having serial number GB 0409671.5, filed Apr. 30, 2004, which is entirely incorporated herein by reference.

TECHNICAL FIELD

The present disclosure relates to a tape guide system for a magnetic tape rotary scan data transfer apparatus.

BACKGROUND

Magnetic tape is commonly used for storage of digital data. The digital data is accessed by a data transfer apparatus, which can perform one or both of storing (writing) data onto the tape or accessing (reading) data previously stored on the tape. A generic term for a magnetic tape data transfer apparatus is a "tape drive." A tape drive normally includes a tape head for one or both of reading and/or writing data from or to the magnetic tape. The tape head itself includes one or more tape head elements, which can perform one or both of these functions.

One type of head used in tape drives is a rotary scan head (also known as a helical scan head). Typically, the rotary scan head is in the form of a drum 80. As shown in FIG. 1, the drum has one or more head elements 90 positioned on its cylindrical surface for performing read and/or write operations. During a loading process of a tape cartridge holding tape for use by the tape drive, a portion of the tape 100 is deployed around the drum 80. During reading and/or writing, the tape 100 is moved in a direction A whilst the drum 80 rotates about an axis B. The drum 80 typically rotates much faster that the speed of movement of the tape 100 so that tracks 101 can be read from, or written to, the tape 100 by the head element 90.

Tape drives using a rotary scan head typically include one or more tape guides in the form of a tape guide assembly. An example tape cartridge 110 and guide assembly 10 for a tape drive is shown in FIGS. 2 and 2a. The tape guide assembly 10 is used to deploy the tape 100 from within the tape cartridge 110 so that at least a portion of the tape is threaded around at least part of the drum 80. The tape guide assembly 10 is also used during reading and/or writing to direct, align, and support the tape 100 as it is moved across the drum 80. The tape guides can either be fixed or stationary guides, such as spindles or rollers, which roll with the tape as the tape moves across the tape head. The tape guides help to align the tape 100 with respect to the drum 80 and may also include flanges 45, 50 to prevent excess lateral movement of the tape. The guides can include powered rollers to assist in transport of the tape across the drum and to provide proper tensioning of the tape.

The guide assembly 10 shown in FIGS. 2 and 2a includes tape guides in the form of a capstan 30, a pinch roller 20, a number of guide posts 40, 50, and a number of inclined posts 60, 70. The guide posts 40, 50 and pinch roller 20 engage the tape 100 within a tape cartridge 110 or other carrier during a loading process. During a deployment process, the guide posts 40, 50 and pinch roller 20 are moved from their respective non-deployed positions (as shown in FIG. 2) engaging the tape 100 and moving along predetermined guide travel paths to respective deployed positions (as shown in FIG. 2a). In this manner, a portion of the tape 100 is extracted from the tape cartridge 110 and is deployed around the drum 80. In its deployed position, the tape 100 is sandwiched by the capstan 30 and the pinch roller 20.

Flanges 45, 55 are typically provided on the top and bottom of the guide posts 40, 50 respectively to restrict lateral movement of the tape 100 with respect to the drum 80. The inclined post 60 is positioned so as to incline the tape with respect to drum 80 when threading onto the drum 80 and the inclined post 70 is positioned to return the tape 100 to the non-inclined position when threading off of the drum 80.

Rotary scan tape drives are designed to use a predetermined size and type of tape cartridge that contains a predetermined length of a predetermined width tape. In this manner, the designer of the tape drive knows the size of the cartridge and the width (w) of tape that must be accommodated and can therefore dimension and position the tape guides and flanges appropriately. The width (w) of the tape typically corresponds to the height (h) of the tape guides so that the tape is aligned with respect to the drum 80 and its head element(s) 90 by the flanges 45, 55 of the guides.

One format for data storage using a rotary scan tape drive is Digital Data Storage (DDS). Various versions of DDS exist and although each version uses the same (approximately 4 mm) width tape in the same Digital Audio Tape (DAT) cartridges, increasingly advanced reading and writing techniques have been used in later versions to achieve greater data storage capacity from the same media as earlier versions. Customers are demanding more and more data storage capacity and in the past, the use of such advanced reading and writing techniques have addressed (at least to some extent) those demands. However, for practical purposes, the storage capacity of a given size of tape is ultimately limited by the available surface area of the tape.

Instead of trying to cram more data onto the same sized tape, one option is to apply the DDS reading and writing techniques to different width tapes. Whilst a greater width tape inherently provides more storage capacity due to the increased surface area available, tape drives and in particular their guide assemblies are currently limited to a single tape cartridge size that holds tape of a predetermined width, which requires that a new tape drive be produced for each different tape width. Not only does this mean increased expense for the user, it also means that existing tapes would not be compatible with the new drives and would require the user to transfer any existing stored data to new tape media or, alternatively, to maintain two tape devices.

One problem faced with tape drives that attempt use multiple of tape widths is encountered during extraction of the tape from its cartridge. Typically, in order to allow a tape cartridge to be loaded into a tape drive, the non-deployed positions of the guides are normally designed so that the guides fit within a cavity 125 in the cartridge 110, when loaded, as is shown in FIG. 2b. The guides are then moved to their deployed positions. In the case of a single tape width, this arrangement is relatively simple to achieve as the height of the guides can be selected to fit the tape width (which the cartridge must inherently be high enough to hold). However, where a tape drive uses multiple tape widths, the height of the cartridge itself may vary, in which case a standard height for guides is not possible. If a tape guide were positioned in its non-deployed position to align itself with the top and bottom edges of the tape, then it would be too high to fit in a cavity of a smaller cartridge shell. Alternatively, if a tape guide were dimensioned to avoid hitting the smaller cartridge shell, it would not engage the full width of a larger width tape in the deployed position.

In order to address this issue, various complex sensing arrangements have been suggested so that a predetermined height may be used for tape guides for each cartridge size so as to accommodate each tape width. However, such arrangements require additional mechanisms, sensors, and control systems and increase the complexity and cost of the tape drives. Where tape guides such as the pinch roller are lowered or raised into position after threading, clearance must be provided to allow the tape to be threaded over or under the tape guide.

Thus, a heretofore unaddressed need exists in the industry to address the aforementioned deficiencies and inadequacies.

SUMMARY

Embodiments of the present disclosure provide systems and method for positioning a tape guide in a digital data transfer apparatus. Briefly described, in architecture, one embodiment of the system, among others, can be implemented as follows. One embodiment of the present disclosure provides a magnetic tape data transfer system for use with a first width magnetic tape having a first width and a second width magnetic tape having a second width that is less than the first width. The system includes a rotary scanning drum having at least one scanning head and a tape cartridge positioning structure for positioning a magnetic tape cartridge. The magnetic tape cartridge contains the magnetic tape at a predetermined location with respect to a reference surface such that the magnetic tape contained therein projects above the reference surface by a distance proportional to the width thereof.

The system also includes a tape guide system for guiding the magnetic tape. When in use, the tape guiding system is moved past the rotary scanning drum during a scanning process. The tape guide system comprises a first tape guide connected to an arm, where the first tape guide has a free end and a guide surface that has a length corresponding substantially to the first width. The arm is mounted on an elongate member so as to be rotatable between a first limit position and a second limit position about an axis of rotation defined by the elongate member. The elongate member is inclined with respect to the arm such that the rotation causes the arm to move axially along the elongate member.

The first tape guide also has a non-deployed position in which the free end projects above the reference surface a first distance that is not substantially greater than the distance by which the second width tape projects above the reference surface. The first tape guide is also movable from the non-deployed position along a predetermined path to a deployed position at which the guide surface engages the magnetic tape for guiding the tape during the scanning process. The predetermined path being defined by rotation of the arm in one direction between the first limit position and the second limit position and the axial movement of the arm along the elongate member imparting a vertical component to the movement along the predetermined path. At the deployed position, the free end projects above the reference surface a second distance, which is greater than the first distance such that when the magnetic tape cartridge at the predetermined location contains the first width magnetic tape the full length of the guide surface engages the magnetic tape.

Embodiment of the present disclosure can also be viewed as providing methods for positioning a tape guide in a digital data transfer apparatus. In particular, the digital data transfer apparatus is configured for use with a first width tape having a first width and contained in a tape cartridge having a predetermined first height and a second width tape having a second width, where the second width is less than the first width, and contained in a tape cartridge having a predetermined second height which is less than the first height. The tape guide has a free end and a guide surface with a length corresponding substantially to a length of a desired line of engagement of the guide surface with the first width tape, when the first width tape and tape guide are in respective deployed conditions. The line of engagement extends between opposite edges of the first width tape.

In this regard, one embodiment of such a method, among others, can be broadly summarized by the following steps: providing a tape guide with a non-deployed position in which it is positioned relative to a reference surface on which the tape cartridge is seated such that the free end projects above the reference surface by a distance less than the second height; and mounting the tape guide on an arm that is rotatably mounted on a shaft which is inclined with respect to the arm, such that rotation of the arm about the shaft in one direction to a predetermined limit raises the tape guide relative to the reference surface to a position at which the free end projects above the reference surface by a distance greater than the second height and at which the guide surface will extend along the desired line of engagement between the opposite edges of a first width tape when the tape cartridge containing the first width tape is seated on the reference surface. The tape guide is raised by the inclined arm during movement to its deployed position. This means that the tape guide does not need to be in the plane used when deploying the tape and can be positioned out of the way in its non-deployed position to avoid conflict with different sized tape cartridge shells.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Embodiments of the present disclosure will now be described in detail by way of example only with reference to the accompanying drawings, in which.

DETAILED DESCRIPTION

Figure 1:
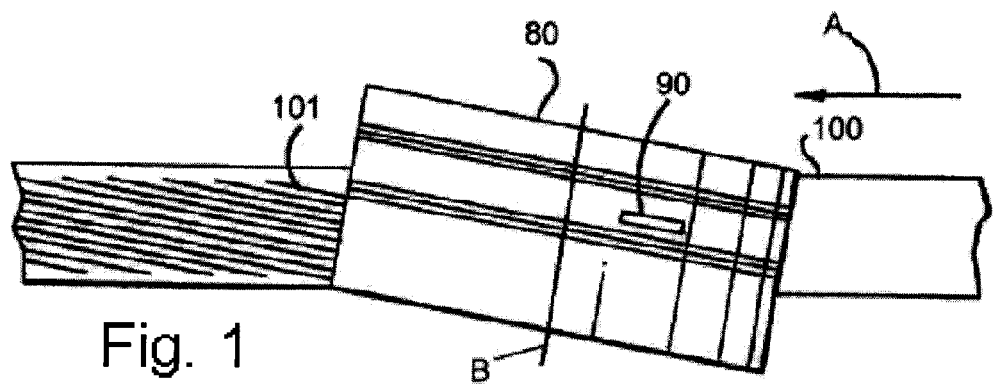
FIG. 1 is a schematic diagram of a prior art arrangement showing a portion of a tape deployed around a rotary scan head.

One embodiment of the present disclosure provides a magnetic tape data transfer apparatus for use with a first width magnetic tape having a first width and a second width magnetic tape having a second width that is less than the first width. The apparatus includes a rotary scanning drum having at least one scanning head and a tape cartridge positioning structure for positioning a magnetic tape cartridge. The magnetic tape cartridge contains the magnetic tape at a predetermined location with respect to a reference surface such that the magnetic tape contained therein projects above the reference surface by a distance proportional to the width thereof.

The apparatus also includes a tape guide system for guiding the magnetic tape. When in use, the tape guiding system is moved past the rotary scanning drum during a scanning process. The tape guide system comprises a first tape guide connected to an arm, where the first tape guide has a free end and a guide surface that has a length corresponding substantially to the first width. The arm is mounted on an elongate member so as to be rotatable between a first limit position and a second limit position about an axis of rotation defined by the elongate member. The elongate member is inclined with respect to the arm such that the rotation causes the arm to move axially along the elongate member.

The first tape guide also has a non-deployed position in which the free end projects above the reference surface a first distance that is not substantially greater than the distance by which the second width tape projects above the reference surface. The first tape guide is also movable from the non-deployed position along a predetermined path to a deployed position at which the guide surface engages the magnetic tape for guiding the tape during the scanning process. The predetermined path being defined by rotation of the arm in one direction between the first limit position and the second limit position and the axial movement of the arm along the elongate member imparting a vertical component to the movement along the predetermined path. At the deployed position, the free end projects above the reference surface a second distance, which is greater than the first distance such that when the magnetic tape cartridge at the predetermined location contains the first width magnetic tape the full length of the guide surface engages the magnetic tape.

One embodiment of the present disclosure also provides a magnetic tape data transfer apparatus for use with a first width magnetic tape having a first width and a second width magnetic tape having a second width that is less than the first width. One embodiment of the apparatus includes a rotary scanning drum having at least one scanning head; and a tape cartridge positioning device for positioning a magnetic tape cartridge containing the magnetic tape at a predetermined location with respect to a reference surface. The upper edge of the second width tape contained in the magnetic tape cartridge is at a predetermined height above the reference surface that is proportional to the width thereof. The apparatus further includes a tape guide system for guiding the magnetic tape.

When in use, the tape guide system is moved past the rotary scanning drum during a scanning process. The tape guide system comprises a first tape guide means and raising means for the first tape guide means. The first tape guide means includes a free end and a guide surface. The first tape guide means also includes a non-deployed position in which the free end is at a height not higher than the predetermined height and is movable from the non-deployed position along a predetermined path to a deployed position, at which the guide surface engages the magnetic tape for guiding the tape during the scanning process.

The raising means includes arm means on which the first tape guide means is mounted. The arm means are mounted on an elongate member so as to be rotatable between a first limit position and a second limit position about an axis of rotation defined by the elongate member. The elongate member is inclined with respect to the arm means, such that the rotation causes the arm means to slide along the elongate member imparting a vertical component to the movement along the predetermined path. At the deployed position, the free end is at a height above the predetermined height, such that when the magnetic tape cartridge at the predetermined location contains the first width magnetic tape, the guide surface fully engages the magnetic tape along a line extending between opposite edges of the guide tape.

The present disclosure also provides an embodiment of a method of positioning a tape guide in a digital data transfer apparatus configured for use with a first width tape having a first width and contained in a tape cartridge having a predetermined first height and a second width tape having a second width, where the second width is less than the first width, and contained in a tape cartridge having a predetermined second height which is less than the first height. The tape guide has a free end and a guide surface with a length corresponding substantially to a length of a desired line of engagement of the guide surface with the first width tape, when the first width tape and tape guide are in respective deployed conditions. The line of engagement extends between opposite edges of the first width tape.

The method includes the steps of providing the tape guide with a non-deployed position in which it is positioned relative to a reference surface on which the tape cartridge is seated such that the free end projects above the reference surface by a distance less than the second height; and mounting the tape guide on an arm that is rotatably mounted on a shaft which is inclined with respect to the arm, such that rotation of the arm about the shaft in one direction to a predetermined limit raises the tape guide relative to the reference surface to a position at which the free end projects above the reference surface by a distance greater than the second height and at which the guide surface will extend along the desired line of engagement between the opposite edges of a first width tape when the tape cartridge containing the first width tape is seated on the reference surface. The tape guide is raised by the inclined arm during movement to its deployed position. This means that the tape guide does not need to be in the plane used when deploying the tape and can be positioned out of the way in its non-deployed position to avoid conflict with different sized tape cartridge shells.

Aspects of the present disclosure seek to provide a tape guide system for a tape drive that facilitates a tape guide to engage different tape widths for reading/writing by the drive. By providing a tape guide that can be used for different widths of tape, wider tapes can more easily be used, providing a greater surface area for storing data and thus greater storage capacity. At the same time as allowing wider tapes (for example 6 mm, 8 mm and/or 10 mm width tapes), existing tape widths (typically of 4 mm widths) can also be used, meaning that the new drive would also be compatible with any existing media used. As the guide does not contact the tape during loading or threading, it can be positioned wherever there is space in the tape drive.

Embodiments of the present disclosure include a tape guide system for supporting magnetic tape about a rotary scan drum of a data transfer apparatus. The tape guide system includes a tape guide connected to an arm. The tape guide has a deployed position in which a supporting surface supports the magnetic tape and a non-deployed position in which the supporting surface is spaced from and non-aligned with a surface of the tape to be supported, where the arm is arranged to be driven about an axis of rotation towards the deployed position. The axis of rotation of the arm is inclined such that, in the deployed position at least part of the supporting surface of the tape guide is substantially aligned with the surface of the tape to be supported.

Embodiments of the present disclosure include a tape guide system having tape guide means for guiding magnetic tape deployed around a rotary scan drum of a data transfer apparatus and rotation means in communication with the tape guide means for rotating the tape guide means about an inclined axis of rotation to thereby raise the tape guide from a non-deployed position to a deployed position to engage the tape. Embodiments of the present disclosure also include a method of moving a tape guide in a rotary scan tape drive from a non-deployed position in which a supporting surface of the tape guide is non-parallel to a surface of a tape to be supported to a deployed position in which the supporting surface is substantially parallel to, and engages with, the surface of the tape to be supported. The method includes the step of rotating the tape guide about an axis of rotation that is inclined relative to a surface of the tape to be supported through a predetermined angle.

Embodiments of the present disclosure include a magnetic tape rotary scan data transfer apparatus comprising a rotary scan drum for reading from and writing to magnetic tape; a tape guide system for supporting magnetic tape around the rotary scan drum; and a drive for moving tape deployment guides in a plane from a non-deployed position to a deployed position to deploy at least a portion of the tape around at least part of a rotary scan drum. The tape guide system includes a tape guide mounted on an arm. The tape guide has a supporting surface for supporting the magnetic tape in the tape guide's deployed position and has a non-deployed position in which the supporting surface is spaced from and non-parallel to a surface of the tape to be supported. The arm is arranged to be rotated about an axis that is inclined relative to the surface of the tape to be supported to move the tape guide to the deployed position, thereby substantially aligning at least part of the supporting surface of the tape guide with the surface of the tape to be supported.

In one advantageous embodiment, the drive used for horizontal movement of conventional tape guides within the tape drive can also be used to drive a tape guide system in a direction having both horizontal and vertical components. In this manner, a tape guide system according to an embodiment of the present disclosure can be cheaply and relatively simply implemented in tape drives without the need for additional drive systems or the like.

Figure 2:
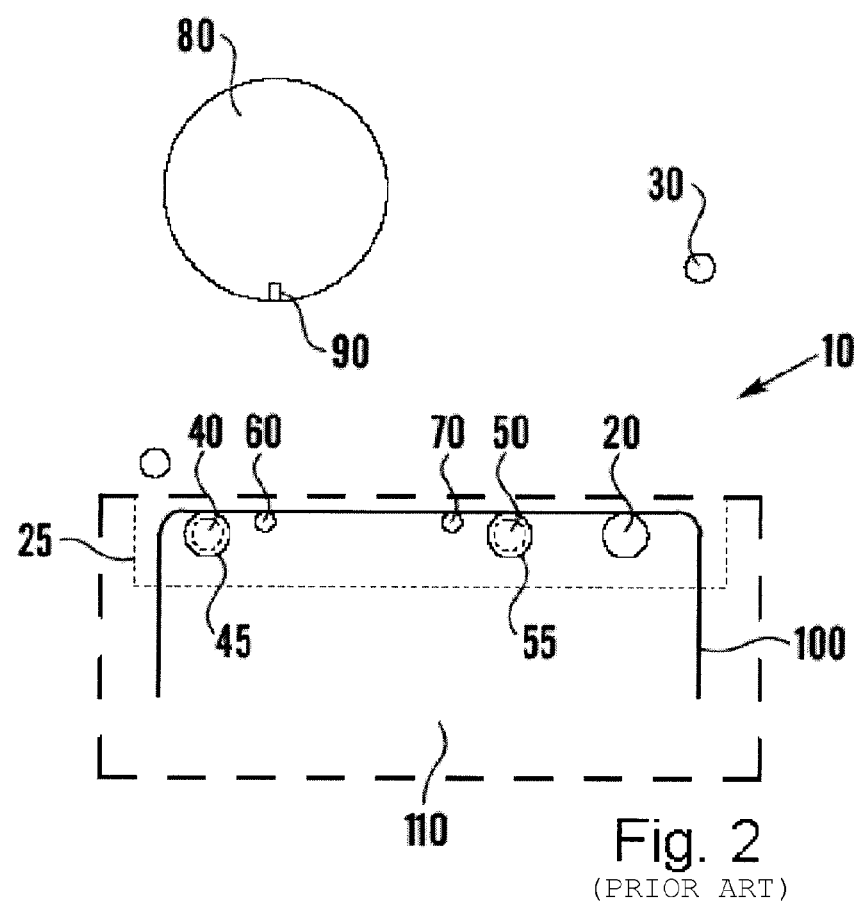
FIG. 2 is a schematic diagram of a prior art tape cartridge and guide assembly for a tape drive prior to deploying tape from the tape cartridge.
Figure 2A:
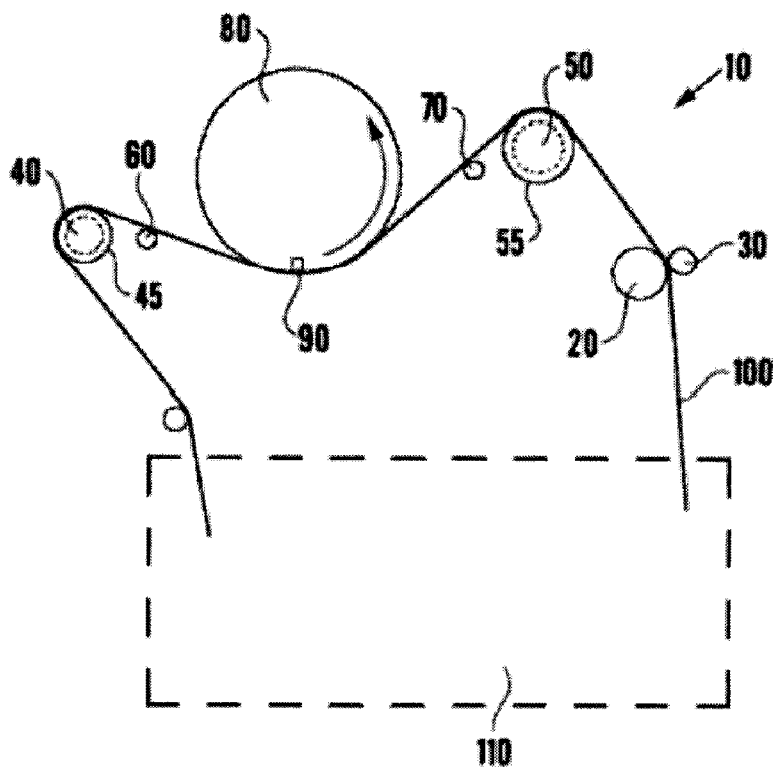
FIG. 2a is a schematic diagram of the assembly of FIG. 2 showing the tape cartridge and guide assembly when the tape is deployed.
Figure 2B:
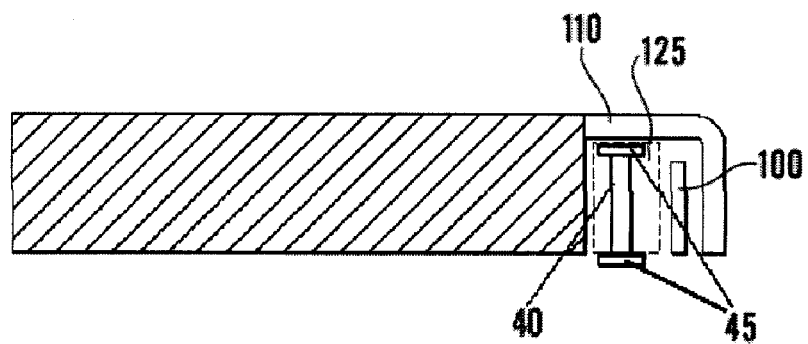
FIG. 2b is a sectional side view of a tape cartridge and tape guide.
Figure 3:
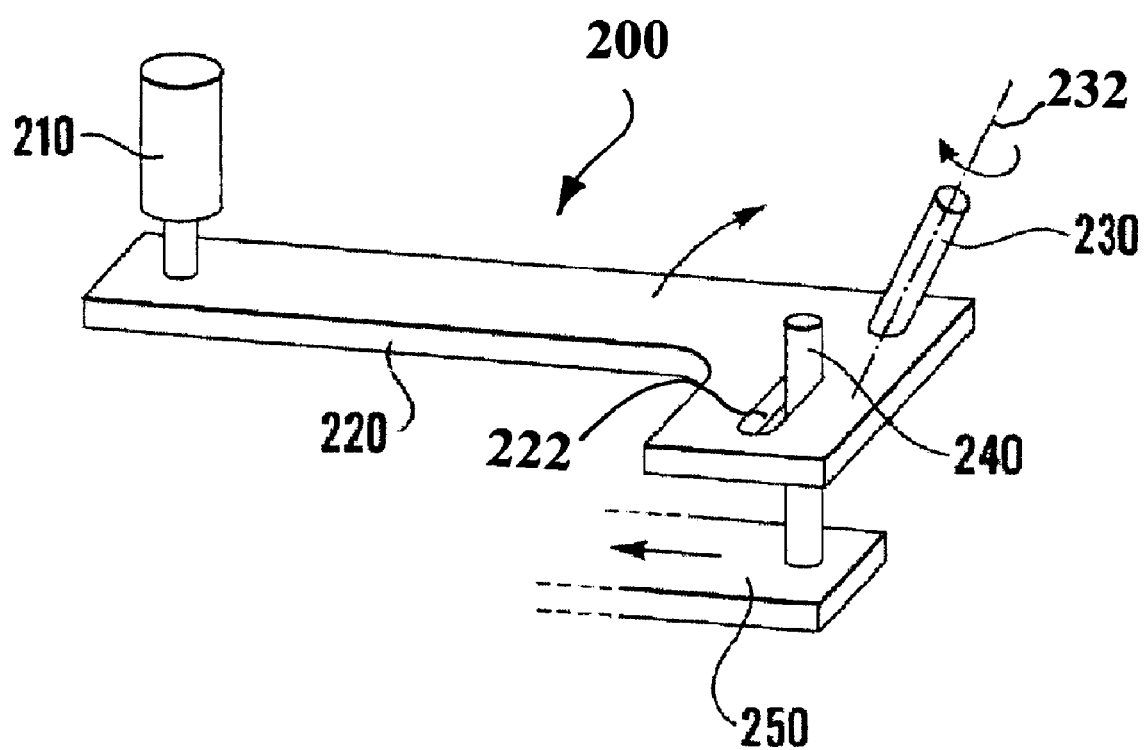
FIG. 3 is a perspective view of a tape guide system according to an embodiment of the present disclosure.

FIG. 3 is a perspective view of a tape guide system 200 for use in supporting tape deployed around a rotary scan drum according to an embodiment of the present disclosure. To avoid repetition of description parts corresponding to, or similar to the parts shown in FIGS. 1 to 2b, will be referenced using the same reference numerals.

Referring to FIG. 3, the tape guide system 200 includes an arm 220, which is fixed about a shaft 230 to allow the arm 220 to rotate about the shaft 230. The axis of rotation 232 about the shaft is inclined such that it is at an angle with respect to the arm 220. The arm 220 is connected to a guide post 210. The arm 220 defines an elongate slot 222. A pin 240 that engages with a drive 250 extends through the slot 222 allowing the drive 250 to move the arm 220 and therefore the guide post 210.

Figure 4:
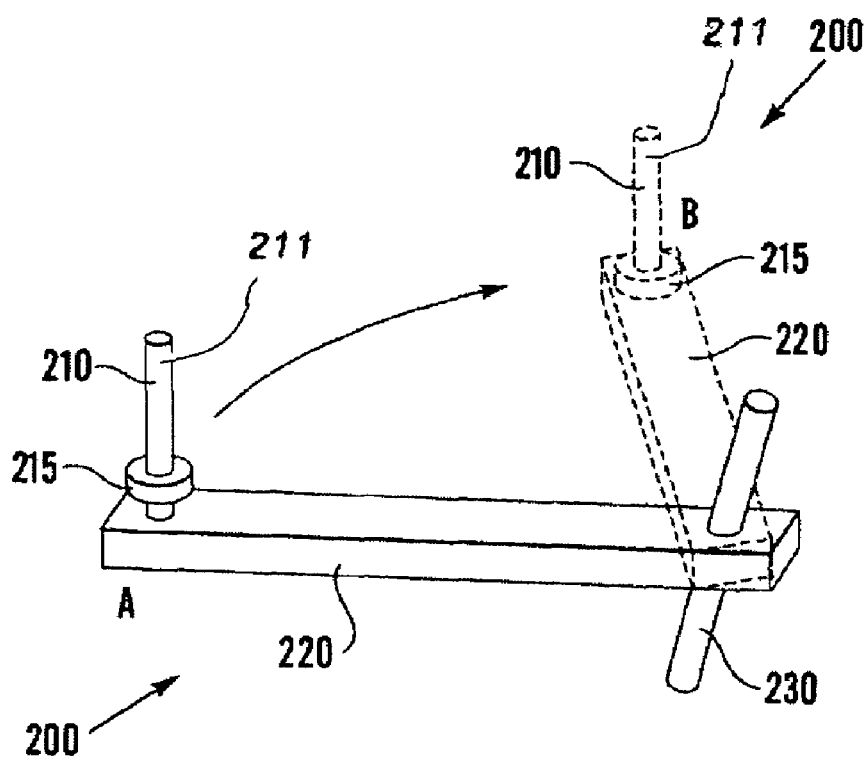
FIG. 4 is a simplified schematic diagram of the tape guide system of FIG. 3 in deployed and non-deployed positions.

FIG. 4 is a simplified schematic diagram showing the tape guide system 200 in deployed (finish) and non-deployed (start) positions. The tape guide system 200 is shown in its non-deployed position (labeled A) as solid lines and in its deployed position (labeled B) as dotted lines. During a tape deployment process, the drive 250 is operated, moving the pin 240, which in turn rotates the arm 220 about the shaft 230. Due to the inclination of the shaft with respect to the arm 220, rotation of the arm raises the guide post 210 by causing it to move along the shaft 230.

Figure 5:
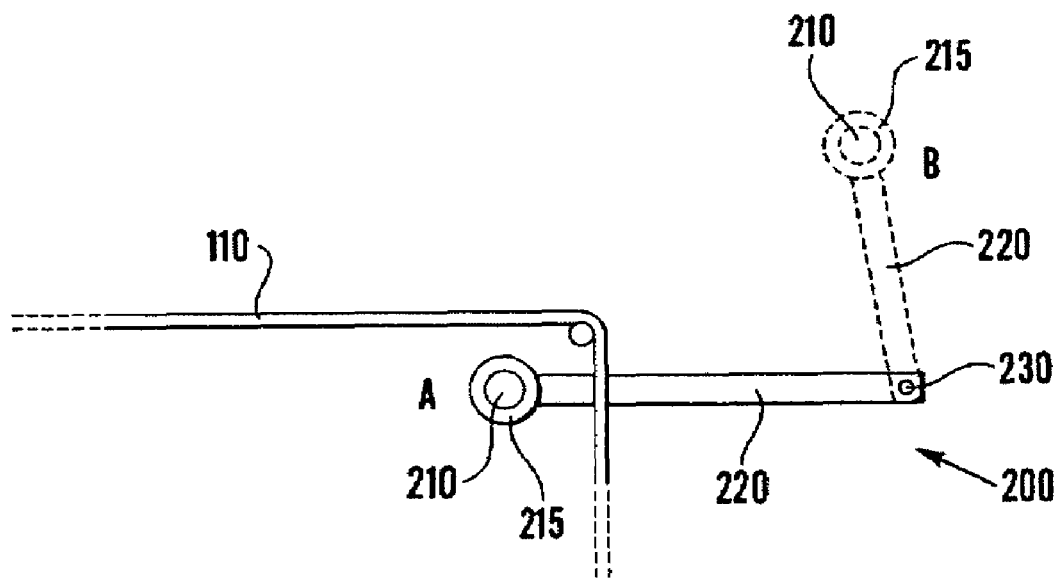
FIG. 5 is a simplified plan view of the tape guide system of FIG. 3 in deployed and non-deployed positions.

FIG. 5 is a simplified plan view of the tape guide system of FIG. 4 including a tape cartridge. The guide post 210 is positioned in its non-deployed position to fit at least partially in a cavity 125 (FIG. 6) in a tape cartridge 100 having the lowest width tape supported. The drive 250 would typically be operated to move other tape guides (not shown) to deploy at least a portion of tape 110 from the tape cartridge 100 around at least a portion of a rotary scan head. The operation of the drive causes the pin 240 to move, which in turn rotates the arm 220 about the shaft 230. Rotation of the arm 220 raises the guide post 210 as it is moved towards to its deployed position.

The guide post 210, in some embodiments, is arranged to move behind, and spaced apart from, the tape so that a supporting surface 211 of the tape guide engages the tape 100 only at the moment of, or after, the tape has reached its deployed position.

For simplicity, the supporting surface 211 of the guide post 210 and a portion of the arm 220 that would normally be seen in position B of FIG. 5 have been omitted from the Figure. However, the reader will appreciate that due to position B being elevated, in effect, out of the page, these parts would be seen in the actual embodiment.

The height of the supporting surface 211 of the guide post 210 is selected to be at least the width of the largest tape to be supported. The axis of rotation is selected so that the guide post rises to align at least sufficiently with the supporting surface 211 of the guide post 210 to support the full width (w) of the largest tape, when in the deployed position.

The guide post 210 may include a flange 215 about its base so that the lower edge of tapes of all widths are aligned with the base of the guide post 210 when it reaches its deployed position and no tape slips any lower. The guide post 210 may also include an upper flange (not shown) which would function as normal for the largest tape but only in extreme cases of instability for the smaller tapes.

Due to the rotation of the arm 220, the plane of the supporting surface 211 of the guide post 210 will itself change during movement between non-deployed and deployed positions. To address this to ensure the plane of the supporting surface 211 is substantially parallel to the surface of the tape to be supported when the tape guide is in its deployed position, the arm may be connected to the tape guide at a predetermined angle. In practice, the predetermined angle may be selected in dependence on a desired engaged orientation of the plane of the supporting surface, the radius of rotation of the arm, angle of rotation, and angle of the axis of rotation.

Figure 6:
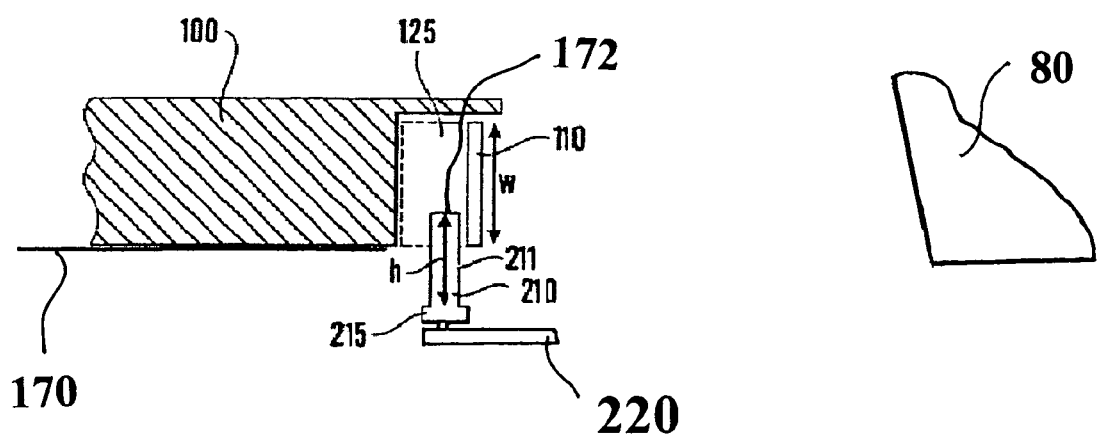
FIG. 6 is a schematic side sectioned view showing a tape guide of the tape guide system in its non-deployed position of FIG. 5 projecting upwardly into a cavity defined by a magnetic tape cartridge.
Figure 7:
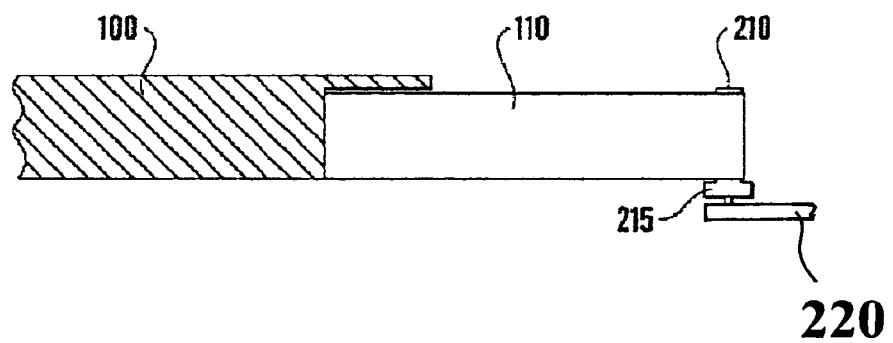
FIG. 7 is a view corresponding to FIG. 6 showing the tape guide in its deployed position of FIG. 5.
Figure 8:
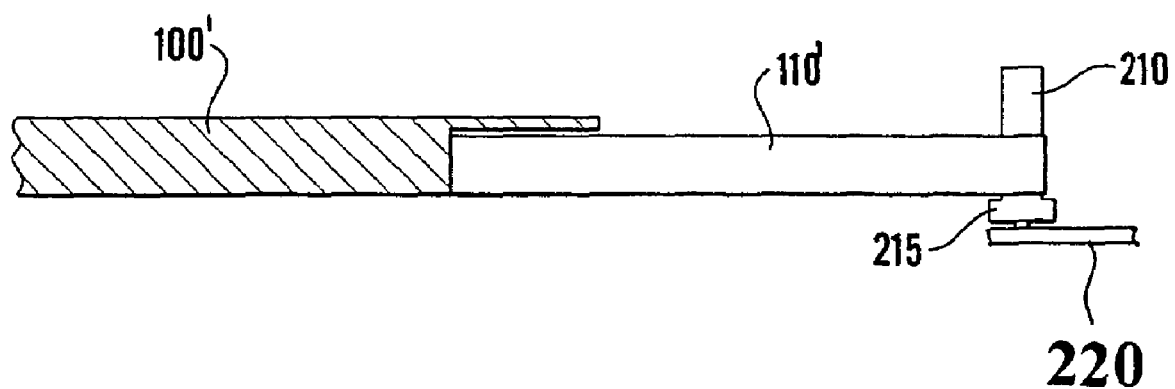
FIG. 8 is a view corresponding to FIG. 7 showing a narrower width tape.

FIGS. 6 and 7 show the tape guide system in use in a tape drive. The tape drive is configured to handle tape cartridges 100 containing a relatively wider tape 110 and cartridges 100' containing relatively narrow tape 110' (shown in FIG. 7). The tape drive comprises a tape cartridge positioning device (not shown) that locates the tape cartridges 100, 100' at a predetermined location with respect to a reference surface 170 and the tape guide system 200. The cartridge positioning device may be of any suitable known type.

In this embodiment, the reference surface 170 is a surface of the tape cartridge positioning device that supports the underside of the tape cartridge 100. The arrangement is such that the free end 172 of the tape guide 210 projects above the reference surface a predetermined distance that is not substantially greater than the distance by which the narrower tape 110' projects above the reference surface. The respective distances by which the tapes 100, 100' project above the reference surface 170 are proportional to the width (w) of the tape and will be known for each width of the tape the tape drive is designed to receive.

As shown in FIG. 6, in its non-deployed position, the guide post 210 projects into a cavity 125 in the underside of the magnetic tape cartridge and is positioned behind the tape 100 in the direction of movement of the tape towards the rotary scanning drum 80. Thus, the guide post 210 is stationed between the rear, non-magnetic face of the magnetic tape, and the pair of reels (not shown) on which the tape is held.

During a tape deployment process, rotation of the arm 220 about the shaft 240 rotates and raises the guide post 210 to its deployed position. As shown in FIG. 7, when the guide post 210 reaches its deployed position, the guide surface 211 of the guide post 210 is aligned with a surface of the tape to be supported.

It will be appreciated that the guide post carried by the arm 220 could be a static guide post, a roller, an inclined post, or a pinch roller. Indeed, it can be envisaged that tape guide assemblies could be produced in which some or all guide posts, inclined posts, and pinch roller(s) are formed in accordance with embodiments of the present disclosure so as to be raised from non-deployed positions to deployed positions. The guide posts do not need to have flanges and this will depend on the type of guide post and widths of tape supported. Furthermore, not all of the guides need to be initially positioned beneath a cavity within a tape cartridge when it is loaded and could be positioned wherever there is space in the tape drive.

Although the embodiments have been discussed only in respect of two different tape widths, it will be apparent that the teachings of the present disclosure may be extended such that a greater number of tape widths can be accommodated. Indeed, techniques of the present disclosure are sufficiently versatile that tape widths less than an envisaged maximum width can be engaged by a tape guide according to an embodiment of the present disclosure without further modification. If a tape width greater than the maximum envisaged width is desired then the axis of rotation and/or deployed position may require adjustment so that the tape guide is raised sufficiently to accommodate the whole width of the largest width tape.

In some embodiments, a tape guide is mounted at a predetermined angle on the arm such that it engages the tape at an appropriate angle in its deployed position. In some embodiments, the guide post is arranged such that it extends perpendicular to the length of the magnetic tape when engaging the tape. In this case, the length/height of the guide surface need only be a small amount greater than the width of the largest width tape. If the guide post is to be inclined when it engages the tape such that its length is non-perpendicular to the length of the magnetic tape at the point of engagement, the length will need to be greater than the width of the largest width tape to ensure that the guide surface extends the full distance between opposite edges of the tape according to the angle at which it is designed to engage the tape.

Although the above described embodiments relate to a tape guide system being arranged to raise a tape guide into a deployed position, it will be appreciated that the concepts discussed above could be implemented in an embodiment of the present disclosure such that the tape guide is moved in any orientation (for example: lowered from above).

The above described embodiments are intended to be illustrative and not restrictive. It should be emphasized that the above-described embodiments of the present disclosure are merely possible examples of implementations, merely set forth for a clear understanding of the principles of the present disclosure. Many variations and modifications may be made to the above-described embodiment(s) of the present disclosure without departing substantially from the spirit and principles of the present disclosure. All such modifications and variations are intended to be included herein within the scope of this disclosure and protected by the following claims.

Therefore, having thus described the invention, at least the following is claimed:

1. A magnetic tape data transfer apparatus for use with a first width magnetic tape having a first width and a second width magnetic tape having a second width that is less than said first width, said apparatus comprising:

a rotary scanning drum having at least one scanning head;

a tape cartridge positioning structure for positioning a magnetic tape cartridge containing said magnetic tape at a predetermined location with respect to a reference surface such that the said magnetic tape contained therein projects above said reference surface by a distance proportional to the said width thereof; and a tape guide system for guiding the magnetic tape, wherein when in use, said tape guide system is moved past said rotary scanning drum during a scanning process, said tape guide system comprising a first tape guide connected to an arm, said first tape guide having a free end, a guide surface that has length corresponding substantially to said first width, and said arm being mounted on an elongate member so as to be rotatable between a first limit position and a second limit position about an axis of rotation defined by the elongate member, said elongate member being inclined with respect to said arm such that said rotation causes the arm to move axially along said elongate member, said first tape guide having a non-deployed position in which said free end projects above said reference surface a first distance that is not substantially greater than said distance by which said second width tape projects above said reference surface and being movable from said non-deployed position along a predetermined path to a deployed position at which said guide surface engages the magnetic tape for guiding the tape during said scanning process, said predetermined path being defined by rotation of said arm in one direction between said first limit position and said second limit position and said axial movement of said arm along said elongate member imparting a vertical component to said movement along said predetermined path, whereby at said deployed position said free end projects above said reference surface a second distance which is greater than said first distance such that when the magnetic tape cartridge at said predetermined location contains said first width magnetic tape the full length of the guide surface engages the magnetic tape.

2. Apparatus as claimed in claim 1, wherein the first tape guide is connected to the arm at an angle, such that when the tape guide is in its deployed position, the guide surface is substantially parallel to the surface of the tape to be supported.

3. Apparatus as claimed in claim 1, further comprising a shaft extending through a slot defined by said arm, translation of said shaft being transmitted to said arm and causing said rotation of the arm about said elongate member.

4. Apparatus as claimed in claim 1, further comprising a drive for moving tape guides in a plane from a non-deployed position to a deployed position to deploy at least a portion of the magnetic tape around at least part of the rotary scanning drum, the arm being connected to the drive for causing said rotation of the arm about the elongate member.

5. Apparatus as claimed in claim 1, wherein, when in the non-deployed position, said free end projects by said first distance into a cavity defined by said tape cartridge located at said predetermined location.

6. Apparatus as claimed in claim 1, wherein said vertical component of movement is substantially equal to said first width less substantially said second width.

7. Apparatus as claimed in claim 1, wherein said first width and second width magnetic tapes project vertically above said reference surface by respective distances corresponding substantially to said first and second widths.

8. A magnetic tape data transfer apparatus for use with a first width magnetic tape having a first width and a second width magnetic tape having a second width that is less than said first width, said apparatus comprising:
   a rotary scanning drum having at least one scanning head;
   a tape cartridge positioning device for positioning a magnetic tape cartridge containing said magnetic tape at a predetermined location with respect to a reference surface such that an upper edge of said second width tape contained in said magnetic tape cartridge is at a predetermined height above said reference surface that is proportional to the said width thereof; and
   a tape guide system for guiding the magnetic tape, wherein when in use, said tape guide system is moved past said rotary scanning drum during a scanning process, said tape guide system comprising a first tape guide means and raising means for said first tape guide means, said first tape guide means having a free end and a guide surface,
   said first tape guide means having a non-deployed position in which said free-end is at a height not higher than said predetermined height and being movable from said non-deployed position along a predetermined path to a deployed position at which said guide surface engages the magnetic tape for guiding the tape during said scanning process, said raising means comprising arm means on which said first tape guide means is mounted, said arm means being mounted on an elongate member so as to be rotatable between a first limit position and a second limit position about an axis of rotation defined by said elongate member and said elongate member being inclined with respect to said arm means such that said rotation causes the arm means to slide along said elongate member imparting a vertical component to said movement along said predetermined path, whereby at said deployed position said free end is at a height above said predetermined height such that when the magnetic tape cartridge at said predetermined location contains said first width magnetic tape the guide surface fully engages the magnetic tape along a line extending between opposite edges of the guide tape.

9. A method of positioning a tape guide in a digital data transfer apparatus configured for use with a first width tape having a first width and contained in a tape cartridge having a predetermined first height and a second width tape having a second width, which is less than said first width, and contained in a tape cartridge having a predetermined second height which is less than said first height, said tape guide having a free end and a guide surface having a length corresponding substantially to a length of a desired line of engagement of said guide surface with said first width tape when said first width tape and tape guide are in respective deployed conditions, said line of engagement extending between opposite edges of said first width tape, said method comprising:
   providing said tape guide with a non-deployed position in which it is positioned relative to a reference surface on which said tape cartridge is seated such that said free end projects above said reference surface by a distance less than said second height; and
   mounting said tape guide on an arm that is rotatably mounted on a shaft which is inclined with respect to said arm, such that rotation of said arm about said shaft in one direction to a predetermined limit raises the tape guide relative to said reference surface to a position at which said free end projects above said reference surface by a distance greater than said second height and at which said guide surface will extend along said desired line of engagement between said opposite edges of a first width tape when said tape cartridge containing said first width tape is seated on said reference surface.

* * * * *